UNITED STATES PATENT OFFICE.

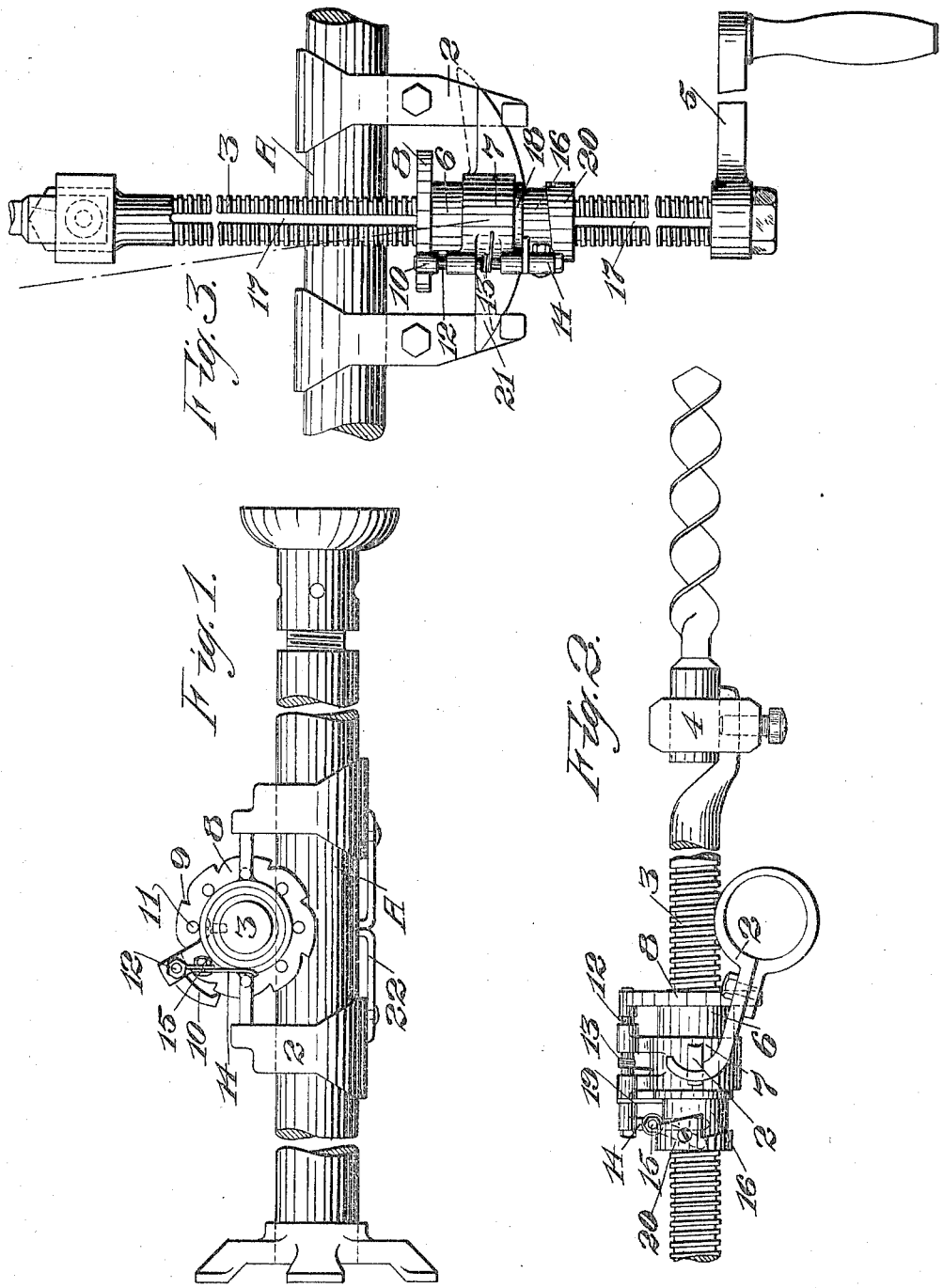

WILLIS C. MOORE, OF LOS ANGELES, CALIFORNIA.

ROCK-BORING MACHINE.

No. 811,943.            Specification of Letters Patent.            Patented Feb. 6, 1906.

Application filed October 20, 1905. Serial No. 283,576.

*To all whom it may concern:*

Be it known that I, WILLIS C. MOORE, a citizen of the United States, residing at Los Angeles, in the county of Los Angeles and State of California, have invented new and useful Improvements in Rock-Boring Machines, of which the following is a specification.

My invention relates to drilling or boring machines, and especially to machines for boring in rock, stone, metal, and like hard substances.

The particular object of my invention is to provide a light cheap simple practical machine for boring or drilling rock for blasting which may be operated by hand or otherwise, which may be easily set up or taken down and moved, and which will have means for automatically regulating the feed of the drill proportionately with the rapidity of the cut.

The invention consists of the parts and the construction and the combination of parts, as hereinafter more fully described and claimed, having reference to the accompanying drawings, in which—

Figure 1 represents a supporting-column and an end elevation of a rock-boring machine embodying my invention. Fig. 2 is a side view of the same with the column omitted. Fig. 3 is a plan view.

The machine is used in connection with a suitable supporting means, as the column or post A, which is made of metal and provided with a screw at one end to allow it to be fixed between the walls. The post may be arranged vertical or horizontal or at an incline. Suitably clamped or otherwise secured to the column A are the hook members 2, by which the drill is held to the work.

3 is a threaded spindle having the usual chuck 4 at one end to carry the drill and provided with appropriate means, as the crank 5, at the opposite end to rotate it by. This spindle is adapted to turn in the nut 6, which is mounted to rotate in a suitable base or bearing 7, removably and adjustably supported on and by the hooks 2. The nut has a peripheral flange 8, which is notched, as at 9, to receive a dog or pawl 10 for the purpose of limiting the rotation of the nut in one direction. The flange is also perforated, as at 11, to receive a spanner or other suitable tool for turning the nut to back up the spindle when it is desired to withdraw the drill from the hole. The pawl 10 is fixed to a rock-shaft 12, suitably journaled on the stationary part 7. A spring 13, having one end secured to the shaft 12 and the other to a fixed part of the machine, operates to maintain the pawl normally in contact with the flange 8. The shaft 12 carries an arm 14, which is jointed at 15 to allow the arm to be adjustable in a plane parallel with the axis of the spindle. Suitable means are provided to engage the arm 14 to rock the shaft 12 and to lift the pawl and allow the nut to turn with the spindle periodically during the rotation of the spindle.

When the pawl is engaged in the notches 9, the nut is held against turning, which acts to feed the spindle and drill forward. The amount of this feed depends on the nature of the material being cut and the rapidity with which the cut may be made. The pitch of the threads on the spindle and nut is such that both the nut and spindle will turn together whenever the nut is released from the pawl. The feed operation is repeated with each revolution of the spindle, unless the feed device is changed by the operator either to hold the nut from turning, thereby causing the feed to be continuous, or unless the pawl is thrown out of engagement altogether with the nut, whereupon no cutting takes place.

In the present instance I have shown the following simple means for operating the lever-arm 14 and the pawl: A sleeve 16 encircles the spindle and turns constantly with it, and the spindle is freely movable through the sleeve, the spindle having a longitudinal keyway 17, while the sleeve has in practice the usual corresponding radial projection or feather (not shown) fitting this keyway. The sleeve has a peripheral flange 18, and a hanger 19 engages over this flange and holds it to the bearing 7, at the same time permitting the rotative movement of the sleeve. The sleeve is provided with a circumferential spiral cam 20, and the arm 14 is adjustable to engage longer or shorter arcs of this cam, according to the length of time that it is desired to lift the pawl during any single revolution of the spindle. Thus with the arm 14 standing substantially vertical, as shown in Fig. 2, it will be engaged and lifted by the cam during only a small portion of the complete revolution of a spindle. On the other hand, if it is adjusted and locked in the dotted-line position shown, it will ride on the cam continually and the pawl will be lifted clear of the notches 9, so that the nut will turn continually with the spindle. Between these two positions the arm may be adjusted so that the length of time that the nut will remain stationary relative to the length of time of the complete revolution of the spindle may be varied indefinitely.

The drill is supported by means of the lateral projections 21 on the part 7, which engages the hooks 2. The projections 21 have their outer contacting surfaces arranged in an arc of a circle to permit the spindle and drill to be held at different angles to the column A, as indicated in dotted lines, Fig. 3.

The hooks 2 may be connected together, or they may be separated, as here shown, by the distance-plates 22.

In operation the supporting-column is set up in relation to the work to be performed, the hooks properly adjusted and clamped, and the machine (including the spindle, bearing, nut, and the sleeve) laid in place with the projections 21 engaged with the hooks on the members 2. The arm 14 is then adjusted according to the desired rate of feed. By turning the handle 5 the spindle is advanced at each revolution corresponding with the disengagement of the arm 14 from the cam 20. Each time the arm 14 rides on the cam the dog lifts to allow the nut to turn, and thus check the feed. When it it desired to withdraw the drill from the hole, the nut is held temporarily against turning by means of a spanner engaged in the holes 11 and the direction of turning of the crank reversed to allow the projections 21 to move forward far enough to clear the hooks, whereupon the entire machine may be lifted and taken out, leaving only the column attached to the hooks.

Having thus described my invention, what I claim, and desire to secure by Letters Patent, is—

1. A boring-machine comprising in combination a threaded spindle having means at one end for the attachment of a drill, a feed-nut on said spindle, a stationary support in which said nut is rotatably mounted, means for rotating the spindle, and means automatically operated by the spindle for turning the nut periodically in unison with the spindle.

2. A boring-machine comprising a threaded spindle having means at one end for the attachment of a drill, a feed-nut on said spindle, a support on which said nut is rotatably mounted, means for rotating the spindle, means for intermittently holding the nut against rotation, and automatically-operated means for releasing the nut and allowing it to turn at intervals in unison with the spindle.

3. The combination in a boring-machine, of a threaded spindle having means at one end for carrying a drill, a feed-nut on the spindle, a support on which said nut is rotatably mounted, means for rotating the spindle, means for holding the nut from turning, and means automatically operated by the spindle to release the nut from its locked position and allowing it to turn periodically in unison with said spindle.

4. The combination in a boring-machine, of a threaded spindle having means at one end for holding a drill, a feed-nut on the spindle, a support on which the nut is mounted to rotate, means for rotating the spindle, means for holding the nut against rotation, and means operated by the rotative movement of the spindle to release the nut and allow the nut and spindle to turn in unison.

5. The combination in a boring-machine, of a threaded spindle having means for carrying a drill, a nut on the spindle, a support in which the nut is mounted to rotate, means for rotating the spindle, means for holding the nut against rotation, and adjustable means automatically and intermittently operated by the spindle for releasing the nut to allow the latter to turn for longer or shorter periods in unison with the spindle.

6. The combination in a boring-machine, of a threaded spindle having means for holding a drill, a feed-nut on the spindle, a support in which the nut is mounted to rotate, means for rotating the spindle, means for holding the nut against rotation, and adjustable means operated by the spindle to release the nut to allow it to turn periodically in unison with the spindle.

7. In a boring-machine, the combination of a threaded spindle having means for holding a drill, a feed-nut on the spindle, a support for the nut, said support having lateral segmental projections, and suitably-supported hook members engaging said projections to hold the drill to the work, said segmental projections loosely engaged over said hook members and permitting a limited oscillatory movement of the spindle, and means for rotating the spindle.

8. In a boring-machine, the combination of a threaded spindle having means for holding a drill, a feed-nut on the spindle, a support in which the feed-nut is mounted to rotate, means for rotating the spindle, a spring-pressed dog engaging the nut to hold the latter against rotation, a cam member turnable with and slidable lengthwise relative to the spindle, and means operated by the cam member to actuate the dog to release the nut.

9. In a boring-machine, the combination of a threaded spindle having means for holding the drill, a feed-nut on the spindle, a support in which the feed-nut is mounted to rotate, means for rotating the spindle, a spring-pressed dog engaging the nut to hold the latter against rotation, a cam member turnable with and slidable lengthwise relative to the spindle, means operated by the cam member to actuate the dog to release the nut, and means for varying the length of the period of the turning movement of the nut relative to a complete revolution of the spindle.

In testimony whereof I have hereunto set my hand in presence of two subscribing witnesses.

WILLIS C. MOORE.

Witnesses:
J. FRANK POTTS,
CLARENCE SCHATTENFELS.